April 24, 1951 — C. V. FIELDS — 2,550,112
SEALED TERMINAL BUSHING
Filed May 28, 1947
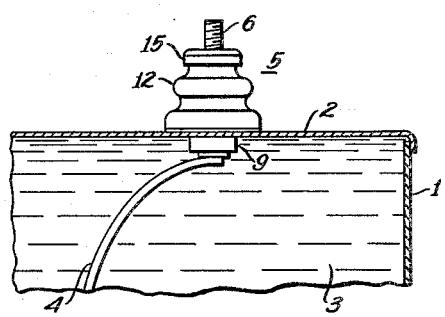
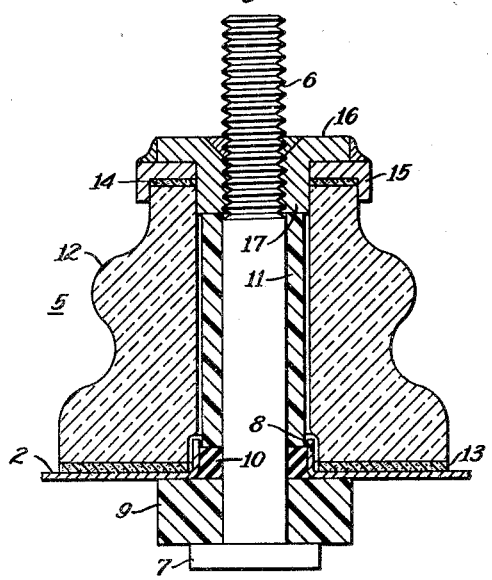
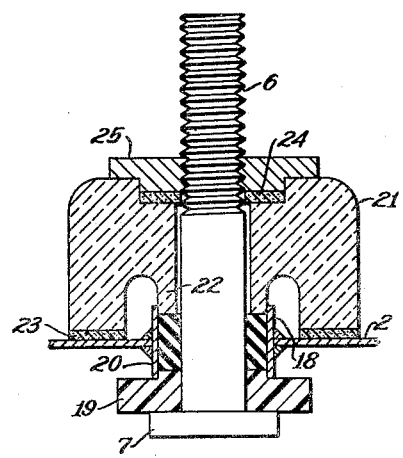
WITNESSES:
Robert C Baird
Nw. C. Groome
INVENTOR
Charles V. Fields.
BY J. P. Lyle
ATTORNEY Patented Apr. 24, 1951

2,550,112

UNITED STATES PATENT OFFICE 2,550,112

SEALED TERMINAL BUSHING

Charles V. Fields, Pittsburgh, Pa., assignor to Westinghouse Electric Corporation, East Pittsburgh, Pa., a corporation of Pennsylvania Application May 28, 1947, Serial No. 750,938

2 Claims. (Cl. 174—153)

The present invention relates to terminal devices for electrical apparatus, and more particularly, to a terminal device for use with electrical apparatus of a type which is enclosed in a sealed housing.

The terminal device of the present invention is particularly adapted for use with power capacitors, although it will be obvious that its usefulness is not necessarily restricted to this particular application. Capacitors of the type used for power factor correction consist of a plurality of capacitor elements or sections made up of interleaved metal foils and thin paper dielectric, assembled in a sealed metal housing or case containing a liquid dielectric material which impregnates the paper and substantially fills the housing. The terminal devices, by means of which the capacitor is connected to the external circuit, pass through the housing and must be sealed in order to prevent leakage of liquid from the housing or entrance of moisture into the housing.

One type of terminal device which has been used in capacitors utilizes a terminal stud which passes through a porcelain bushing on the outside of the housing, and cemented gaskets are placed at the top and bottom of the bushing and compressed to seal the terminal device. The conditions encountered in power capacitors, however, sometimes become too severe for seals of this type, and leakage and failures occur, especially in the case of high-frequency capacitors, where relatively heavy currents are involved and considerable heating occurs. Thus, the capacitor housing is filled with liquid which becomes quite hot during operation and tends to expand, imposing considerable hydrostatic pressure on the seal, which occurs at the same time that the terminal device is subjected to severe mechanical stresses due to thermal expansion of the heavy bus bars which are secured to the terminal when the capacitor is in service. This combination of high hydrostatic pressure and severe mechanical stresses frequently proves too much for a seal depending on compressed flat gaskets, and leakage, or failure of the seal, result. The temperatures encountered in the operation of high-frequency capacitors are also often high enough to soften shellac, or other cements, used with the gaskets, at the same time that the conditions mentioned above are most severe. Repeated heating and cooling in service also have an adverse effect on the gasket material itself, and tend to make it hard and brittle, thus reducing the life of the seal.

A further disadvantage of the type of terminal device mentioned is the fact that it is necessary to assemble it on the housing after drying and impregnation of the capacitor. In the manufacture of capacitors, after the individual capacitor sections are assembled in the housing, the entire assembly is dried under vacuum at a temperature of the order of 135° C., in order to remove all traces of moisture, and the housing is then filled with the insulating liquid to impregnate the sections and fill the housing. The cemented gaskets used in the past for sealing terminal bushings on capacitors could not safely be subjected to temperatures as high as that used in the drying operation, and it was therefore necessary to assemble the terminals on the housing after drying and impregnation. When this was done, however, it was extremely difficult, if not impossible, to remove all traces of the liquid, which is usually of an oily nature, from the surface of the housing, and imperfect seals often resulted because of the presence of traces of liquid. For the reasons mentioned, therefore, the type of sealed terminal which has previously been used is not entirely suitable for applications such as high-frequency capacitors, where high operating temperatures and severe mechanical stresses may be encountered.

The principal object of the present invention is to provide a terminal device for electrical apparatus of a type enclosed in a sealed housing, which includes a seal that is capable of withstanding considerable hydrostatic pressure from liquid contained in the housing, even when combined with severe mechanical stress, and which can be assembled on the housing at any time in the course of manufacture of the apparatus without adversely affecting the seal.

Another object of the invention is to provide a sealed terminal device including a resilient primary sealing member or gland, and secondary sealing means in series with the primary seal, the secondary sealing means preventing the escape of any seepage from the primary seal, and being available as an emergency seal in case of failure of the primary seal.

A further object of the invention is to provide a terminal device incorporating a resilient sealing member or gland which can be compressed sufficiently to provide a more effective seal than can be obtained with flat gaskets. It is preferred to make this sealing member of a resilient material, such as silicone rubber, which is not adversely affected by high temperatures or by contact with liquids of the type used in capacitors.

Further objects and advantages of the invention will be apparent from the following detailed description, taken in connection with the accompanying drawing, in which:

Figure 1 is a fragmentary sectional view of a portion of the housing of a capacitor, showing the terminal device in place;

Fig. 2 is a sectional view of the terminal device, on a larger scale; and

Fig. 3 is a sectional view of a terminal device, showing a modified embodiment of the invention.

As indicated above, the new terminal device is particularly adapted for use on capacitors, and is shown in Fig. 1 mounted in place on a capacitor housing. The housing itself may consist of a side wall portion 1 and a cover portion 2, which is sealed to the side wall in any suitable manner, as by welding. The housing is substantially filled with a suitable liquid dielectric medium 3, which may be a noninflammable material, such as chlorinated diphenyl, or which may be mineral oil or other suitable liquid. The capacitor elements contained in the housing are connected to the external circuit by means of a lead 4, which is connected to a terminal device 5 mounted on the cover portion 2 of the housing.

The terminal device 5 is shown in detail in Fig. 2. The terminal device includes a metal terminal stud 6, which is threaded at its upper end, and which has a terminal block or head 7 at its lower end to which the lead 4 may be secured by brazing or soldering, or in any other suitable manner. The stud 6 passes through an opening in the housing 2, and the opening is provided with a flange 8 extending axially of the terminal stud. The flange 8 is shown as being integral with the housing 2, but it will be obvious that a separate flange member might be provided and secured to the housing by welding or brazing. The terminal stud 6 passes through a block 9 of insulating material within the housing which engages the head 7 of the terminal stud to space the head from the housing 2 and to insulate it from the housing.

The opening in the housing through which the stud 6 passes is sealed by means of an annular resilient sealing member or gland 10, which encircles the stud 6 in the opening and rests on the insulating block 9. The sealing member 10 is preferably made of an elastomeric polysiloxane material, of the type usually referred to as silicone rubber, although other suitable resilient materials might also be used, such as natural rubber, or synthetic rubbers which are not adversely affected by heat or by contact with the liquid 3. The sealing member 10 substantially fills the annular space between the stud 6 and the flange 8, and when compressed, will flow into tight engagement with the stud and the flange so as to form a tight and effective seal. Pressure is applied to the sealing member 10 to compress it by means of a sleeve 11 of rigid insulating material, which fits on the stud 6 and rests on the sealing member 10.

The terminal stud 6 is insulated from the housing 2 on the outside of the housing, and adequate creepage distance between the stud and housing is provided, by means of terminal bushing 12, which is made of porcelain, or other suitable insulating material, and which fits over the outside of the insulating sleeve 11. A gasket 13 is placed between the bushing 12 and the housing 2, and a second gasket 14 is placed on the top of the bushing 12. The gaskets 13 and 14 may be made of any suitable gasket material and may, if desired, be cemented in place, or they may be made of the same material as the sealing member 10. An annular metal cap member 15 is placed over the gasket 14 on top of the bushing 12, and a round nut 16 is threaded on the upper end of the terminal stud 6 and engages the cap member 15. The nut 16 also has an axial shoulder portion 17 which extends into the bore of the bushing 12 and engages the upper end of the sleeve 11.

It will be seen that when the nut 16 is tightened down, the sleeve 11 is forced downward against the sealing member 10, which rests on the block 9, and the sealing member 10 is compressed to seal the opening in the housing. After the nut 16 is tightened, it is preferably soldered to the cap member 15 to prevent subsequent loosening of the parts. It will be obvious that by properly dimensioning the parts, any desired amount of compression can be obtained, so as to make the seal liquid-tight or vacuum-tight, as desired. The provision of the shoulder 17 on the nut 16 increases the number of threads in engagement between the stud 6 and the nut, and thus permits relatively heavy pressures to be applied to the sealing member 10. When the nut 16 is tightened down, it also comprises the gaskets 13 and 14, through its engagement with the cap member 15, thus forming secondary seals at the top and bottom of the bushing 12.

It will be apparent that a terminal device has been provided which overcomes the objections discussed above to the type of terminal which depends on cemented gaskets for sealing. Thus, the resilient sealing member 10 provides a much more effective seal than can be obtaiend with flat gaskets, while the gaskets 13 and 14 provide secondary seals in series with the main seal formed by the member 10, so that any seepage which may occur through the main seal will be prevented from escaping by the secondary seals, and they are available for emergency service in case the main seal should fail for any reason. The resilient sealing member 10 has sufficient resilience, and is compressed to a sufficient extent, so that it will withstand very considerable hydrostatic pressure from the liquid 3 contained within the housing, and the effect of mechanical stresses on the seal is not serious because of the resilience of the sealing member. Thus, the adverse conditions encountered in capacitors do not seriously affect the terminal device.

The use of silicone rubber for the resilient sealing member 10 is an important feature of the invention, since the characteristics of this material make it very desirable for use in terminals for capacitors and other electrical devices enclosed in sealed housings. Thus, silicone rubber is substantially unaffected by high temperatures and retains its resilience and insulating properties even at temperatures well above the highest operating temperatures encountered in this service. Furthermore, silicone rubber is not affected by chlorinated diphenyl, or other liquids used in capacitors, and does not contaminate these liquids. A further advantage in the use of this material is that the terminal device can be assembled on the capacitor before drying and impregnation, since the silicone rubber is capable of withstanding the drying temperature employed. If the terminal device is assembled after drying and impregnation, however, the seal 10 can be applied to oily surfaces without affecting its sealing ability, so that it is not necessary to attempt to remove all traces of liquid from the sealing surfaces.

A slightly modified embodiment of the invention is shown in Fig. 3. In this embodiment the terminal stud 6 extends through an opening in the housing 2, which is provided with a peripheral flange portion 18 formed by a separate cylindrical element brazed or welded to the housing 2, although it will be apparent that the flange might be formed integral with the housing, as in Fig. 2. The stud 6 passes through an insulating block 19 within the housing, the head 7 of the stud engaging the block. A sealing member or gland 20, which may be similar to the sealing member 10 of Fig. 2, and which is preferably made of the same material, encircles the stud 6 in the opening of the housing, and substantially fills the space between the stud and the flange 18, the sealing member 20 resting on the insulating block 19.

A porcelain bushing 21 is provided on the outside of the housing around the stud 6. In this embodiment of the invention, the bushing 21 itself has an axial sleeve portion 22, which fits closely around the stud 6 and which engages the top of the sealing member 20. A gasket 23 is placed between the bottom of the bushing 21 and the housing 2, and a second gasket 24 is placed in a central recess in the top of the bushing 21. A nut 25 is threaded on the stud 6, and has a shoulder portion which is adapted to enter the recess and engage the gasket 24 at the top of the bushing 21. It will be seen that when the nut 25 is tightened down, the gaskets 23 and 24 are compressed, and the sealing member 20 is compressed between the insulating block 19 and the sleeve portion 22 of the bushing 21 to cause the sealing member to seal the opening. It will be apparent that the operation and effectiveness of this construction are substantially the same as those described above in connection with the embodiment of Fig. 2, and that the same advantages are obtained.

It should now be apparent that a sealed terminal device has been provided for electrical apparatus, such as capacitors, enclosed in a sealed housing, which is capable of withstanding both severe mechanical stresses and considerable hydrostatic pressure of a liquid within the housing. The terminal device is also capable of withstanding high temperature without adverse effect, with resultant long life. Certain specific embodiments of the invention have been shown and described for the purpose of illustration, but it will be apparent that various other embodiments are possible, and it is to be understood therefore that the invention is not limited to the specific details of construction shown, but in its broadest aspects it includes all equivalent embodiments and modifications which come within the scope of the appended claims.

I claim as my invention:

1. A terminal device for electrical apparatus of a type which is enclosed in a sealed housing, said terminal device comprising a terminal stud extending through an opening in the housing, an insulating bushing member surrounding said terminal stud on the outside of the housing, an insulating sleeve member on the terminal stud inside the bushing member, an insulating block encircling the terminal stud inside the housing, an annular sealing member of resilient material encircling the terminal stud in said opening in the housing, said sealing member being held between the sleeve member and the block, means for applying axial pressure to the sleeve member to compress the sealing member and cause it to seal the opening, and secondary sealing means at each end of the insulating bushing.

2. A terminal device for electrical apparatus of a type which is enclosed in a sealed housing, said terminal device comprising a terminal stud extending through an opening in the housing, an insulating bushing member surrounding said terminal stud on the outside of the housing, an insulating sleeve member on the terminal stud inside the bushing member, an insulating block encircling the terminal stud inside the housing, an annular sealing member of resilient material encircling the terminal stud in said opening in the housing, said sealing member being held between the sleeve member and the block, a gasket between the bushing member and the housing, a second gasket at the top of the bushing member, and means for compressing said gaskets and for applying axial pressure to the sleeve member to compress the sealing member and cause it to seal the opening in the housing.

CHARLES V. FIELDS.

REFERENCES CITED

The following references are of record in the file of this patent:

UNITED STATES PATENTS

| Number | Name | Date |
| --- | --- | --- |
| 1,699,745 | Marbury | Jan. 22, 1929 |
| 1,941,397 | Grier | Dec. 26, 1933 |
| 2,017,204 | Fisher | Oct. 15, 1935 |
| 2,278,974 | Christensen | Apr. 7, 1942 |
| 2,418,729 | Schemers | Apr. 8, 1947 |
| 2,425,404 | Touborg | Aug. 12, 1947 |
| 2,439,394 | Lanzalotti et al. | Apr. 13, 1948 |
| 2,447,489 | Clark | Aug. 24, 1948 |

OTHER REFERENCES

Rubber Age, November 1944, pages 173, 174, and 175. (A copy is in the Patent Office library.)